US012013479B2

(12) United States Patent
Nakamizo et al.

(10) Patent No.: US 12,013,479 B2
(45) Date of Patent: Jun. 18, 2024

(54) RADAR SYSTEM, RADAR DEVICE, AND INTERFERENCE AVOIDANCE METHOD

(71) Applicant: Mitsubishi Electric Corporation, Tokyo (JP)

(72) Inventors: Takamichi Nakamizo, Tokyo (JP); Ikuya Kakimoto, Tokyo (JP); Tomoya Matsuda, Tokyo (JP); Masahiro Hagio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/276,884

(22) PCT Filed: Feb. 16, 2022

(86) PCT No.: PCT/JP2022/006231
§ 371 (c)(1),
(2) Date: Aug. 11, 2023

(87) PCT Pub. No.: WO2022/176924
PCT Pub. Date: Aug. 25, 2022

(65) Prior Publication Data
US 2024/0134000 A1      Apr. 25, 2024

(30) Foreign Application Priority Data
Feb. 17, 2021   (JP) ................. 2021-023503

(51) Int. Cl.
*G01S 7/02* (2006.01)
*G01S 13/87* (2006.01)
*G01S 13/95* (2006.01)

(52) U.S. Cl.
CPC .......... *G01S 7/0236* (2021.05); *G01S 7/0232* (2021.05); *G01S 7/0235* (2021.05); *G01S 13/87* (2013.01); *G01S 13/95* (2013.01)

(58) Field of Classification Search
CPC ...... G01S 13/931; G01S 7/023; G01S 7/0235; G01S 2013/93271; G01S 7/0232;
(Continued)

(56) References Cited

U.S. PATENT DOCUMENTS 11,656,322 B2 * 5/2023 Aydogdu .............. G01S 13/343
342/60
2014/0062759 A1   3/2014 Morikawa et al.
(Continued)

FOREIGN PATENT DOCUMENTS

EP       3 438 694 A1     2/2019
JP       H04-235377 A     8/1992
(Continued)

OTHER PUBLICATIONS

International Search Report dated Apr. 12, 2022 in International Application No. PCT/JP2022/006231, 3 pages (Submitting English Translation only).
(Continued)

*Primary Examiner* — Olumide Ajibade Akonai
(74) *Attorney, Agent, or Firm* — XSENSUS LLP (57) ABSTRACT

A radar system, a radar device, and an interference avoidance method are obtained that can utilize frequency effectively even in three or more radar devices. A radar system includes three or more radar devices and a schedule management controller. Schedule management controller predicts an interference time period that is a time period during which the overlapping scanning/radiation range is generated, determines a first interference avoidance measure that is a measure to cause radar devices to use respective different use frequencies while keeping a restriction on the number of frequency channels, in the predicted interference time period, and determines a second interference avoidance measure to be performed by a radar device that is unable to
(Continued)

avoid interference by the first interference avoidance measure.

22 Claims, 6 Drawing Sheets

(58) Field of Classification Search
CPC ...... G01S 13/87; G01S 7/0234; G01S 7/0233; G01S 7/006; G01S 7/40
See application file for complete search history.

(56) References Cited

U.S. PATENT DOCUMENTS

| | | |
|---|---|---|
| 2015/0378005 A1 | 12/2015 | Kojima |
| 2019/0129006 A1* | 5/2019 | Harman ................ G01S 13/878 |
| 2021/0215820 A1* | 7/2021 | Ertan .................... G01S 13/931 |
| 2022/0390583 A1* | 12/2022 | Himmelstoss ........ G01S 7/0236 |

FOREIGN PATENT DOCUMENTS

| | | |
|---|---|---|
| JP | 2000-284045 A | 10/2000 |
| JP | 2004-325130 A | 11/2004 |
| JP | 2010-048716 A | 3/2010 |
| JP | 2013-238532 A | 11/2013 |
| JP | 2014-052274 A | 3/2014 |
| JP | 2014-109548 A | 6/2014 |
| JP | 2015-121452 A | 7/2015 |
| JP | 2016-166836 A | 9/2016 |
| JP | 2018-040663 A | 3/2018 |
| JP | 2019-219315 A | 12/2019 |
| WO | 2014/125958 A1 | 8/2014 |
| WO | 2017/169300 A1 | 10/2017 |

OTHER PUBLICATIONS

Decision to Grant a Patent dated Mar. 28, 2023 in Japanese Patent Application No. 2023-500908, 5 pages.

* cited by examiner

RADAR SYSTEM, RADAR DEVICE, AND INTERFERENCE AVOIDANCE METHOD

CROSS-REFERENCE TO RELATED APPLICATIONS

The present application is based on PCT filing PCT/JP2022/006231, filed Feb. 16, 2022, which claims priority from Japanese Patent Application No. 2021-023503, filed Feb. 17, 2021, the entire contents of each are incorporated herein by reference.

TECHNICAL FIELD

The present disclosure relates to interference avoidance between three or more radar devices.

BACKGROUND ART

Conventionally, interference may occur in radar devices such as weather radars in a case where the number of radar devices is plural and the plurality of radar devices are installed in closer areas, and where main lobes and/or side lobes of the radar devices face each other. There may also be a case in which a radio wave (echo) reflected from a target is subjected to interference (crosstalk). The interference (crosstalk) in a radio wave (echo) reflected from a target may occur when areas covered by respective main lobes of radar devices intersect with each other.

There is a technique of avoiding interference between radar devices. In this technique, a radar device is controlled for its timing of observation, and the timing of observation is monitored when a condition where interference may occur is satisfied, thereby causing the radar device not to perform observation while another radar device performs observation (see, for example, PTL 1). There is another technique of avoiding interference between radar devices. In this technique, each of radar devices notifies other radar devices of a reception beam schedule that indicates transition of an orientation direction of a reception beam, and each of radar devices switches an orientation direction of a transmission beam based on the obtained reception beam schedule of other radar devices such that correlation is minimized between the orientation direction of the reception beam and the orientation direction of the transmission beam (see, for example, PTL 2).

In a case where mechanical scanning is performed by radar devices, there is a technique in which rotations are synchronized between radar devices (see, for example, PTL 3). The type of the radar device in this case includes one that performs electronic scanning by rotating 360° in an azimuth direction. There is also a technique for a case where antenna rotation speeds of a plurality of radar devices are different from each other. In this technique, information representing transition of an orientation direction of each transmission antenna is collected from a plurality of radar devices, an interference timing between the plurality of radar devices is predicted, and the antenna rotation speed is adjusted for at least one of the plurality of radar transmission devices related to the interference timing to avoid occurrence of the interference timing (see, for example, PTL 4).

There is another technique of avoiding interference between radar devices, in which interference signal itself is removed by receiving an intended signal obtained by a transmission signal being reflected from an observation target and an interference signal transmitted from another radar device, and by detecting interference data being interfering (see, for example, PTL 5).

CITATION LIST

Patent Literatures

PTL 1: Japanese Patent Laid-Open No. 2004-325130
PTL 2: Japanese Patent Laid-Open No. 2016-166836
PTL 3: WO 2017/169300 A
PTL 4: Japanese Patent Laid-Open No. 2018-040663
PTL 5: Japanese Patent Laid-Open No. 2019-219315

SUMMARY OF INVENTION

Technical Problem

In each conventional technique of avoiding interference between radar devices, there may be, however, a problem that effective utilization of frequency is not considered.

The present disclosure has been made to solve the problem described above, and it is an object of the present disclosure to obtain a radar system, a radar device, and an interference avoidance method that can utilize frequency effectively even in three or more radar devices.

Solution to Problem

A radar system and radar devices according to the present disclosure include three or more radar devices and a schedule management controller. Each radar device includes: an antenna that transmits a radar wave while changing an orientation direction being a direction in which the radar wave is transmitted, and that receives a reflection wave being the radar wave being reflected; a transceiver, connected to the antenna, that performs a processing of transmitting the radar wave and a processing of receiving a reception signal generated by the antenna from the reflection wave received by the antenna; a signal processor, connected to the transceiver, that performs a signal processing on the reception signal generated from the reflection wave; and a data processor that processes the reception signal processed by the signal processor as observation data. The three or more radar devices are arranged to have an overlapping scanning/radiation range being a range at which at least part of a scanning range of one of the three or more radar devices overlaps with the scanning range or a secondary radiation range of each of other radar devices. The same overlapping scanning/radiation range is overlapped by each of the three or more radar devices. The scanning range and the secondary radiation range of the radar device are ranges in each of which the radar wave, is transmitted and is received while the orientation direction is changed. The schedule management controller includes: a schedule generator that generates a scanning schedule in which temporal transition of the scanning range of each of the three or more radar devices is determined in advance; an interference predictor that predicts one or more interference time periods each being a time period during which the overlapping scanning/radiation range is generated by radiating the radar wave of each of the three or more radar devices transmitting the radar wave according to the scanning schedule, and that generates, for each of the one or more interference time periods that has been predicted, interference information including an interfering/interfered radar device set, the overlapping scanning/radiation range, and the interference time period, the interfering/interfered radar device set being a set of the radar devices each having the scanning schedule in which the radar wave is transmitted to the overlapping scanning/radiation range in the interference time period; an interference avoidance measure determiner that determines, when the interference information in which the interfering/interfered radar device set includes three or more of the radar devices is generated, a first interference avoidance measure and a second interference avoidance measure, the first interference avoidance measure being a measure to make use frequency being a frequency of the radar wave transmitted by each of the radar devices to be different each other while keeping a restriction on the number of frequency channels, the second interference avoidance measure being a measure to be performed by each of the radar devices included in a post-frequency-change interfering/interfered radar device set, the post-frequency-change interfering/interfered radar device set being a set including the radar devices each being unable to avoid interference by the first interference avoidance measure and included in the interfering/interfered radar device set; and a controller that controls each of the three or more radar devices, based on the scanning schedule, the first interference avoidance measure, and the second interference avoidance measure.

An interference avoidance method according to the present disclosure is an interference avoidance method of avoiding interference between three or more radar devices. Each radar device includes: an antenna that transmits a radar wave while changing an orientation direction being a direction in which the radar wave is transmitted, and that receives a reflection wave being the radar wave being reflected; a transceiver, connected to the antenna, that performs a processing of transmitting the radar wave and a processing of receiving a reception signal generated by the antenna from the reflection wave received by the antenna; a signal processor, connected to the transceiver, that performs a signal processing on the reception signal generated from the reflection wave; and a data processor that processes the reception signal processed by the signal processor as observation data. The three or more radar devices are arranged to have an overlapping scanning/radiation range being a range at which at least part of a scanning range of one of the three or more radar devices overlaps with the scanning range or a secondary radiation range of each of other radar devices, the same overlapping scanning/radiation range being overlapped by each of the three or more radar devices, the scanning range and the secondary radiation range of the radar device being ranges in each of which the radar wave, is transmitted and is received while the orientation direction is changed. The interference avoidance method includes: an interference predicting step of predicting one or more interference time periods each being a time period during which the overlapping scanning/radiation range is generated by radiating the radar wave of each of the three or more radar devices according to a scanning schedule in which temporal transition of the scanning range of each of the three or more radar devices is determined in advance, and generating, for each of the one or more interference time periods that has been predicted, interference information including an interfering/interfered radar device set, the overlapping scanning/radiation range, and the interference time period, the interfering/interfered radar device set being a set of the radar devices each having the scanning schedule in which the radar wave is transmitted to the overlapping scanning/radiation range in the interference time period; a frequency determining step of determining, when the interference information in which the interfering/interfered radar device set include three or more of the radar devices is generated, a first interference avoidance measure being a measure to make use frequency being a frequency of the radar wave transmitted by each of the radar devices to be different each other while keeping a restriction on a number of frequency channels, for the radar devices included in the interfering/interfered radar device set; and an interference avoidance measure determining step of determining a second interference avoidance measure to be performed by each of the radar devices included in a post-frequency-change interfering/interfered radar device set, the post-frequency-change interfering/interfered radar device set being a set including the radar devices each being unable to avoid interference by the first interference avoidance measure and included in the interfering/interfered radar device set.

Advantageous Effects of Invention

According to the present disclosure, it is possible to obtain a radar system, a radar device, and an interference avoidance method that can utilize frequency effectively.

DESCRIPTION OF EMBODIMENTS

First Embodiment

Figure 1:
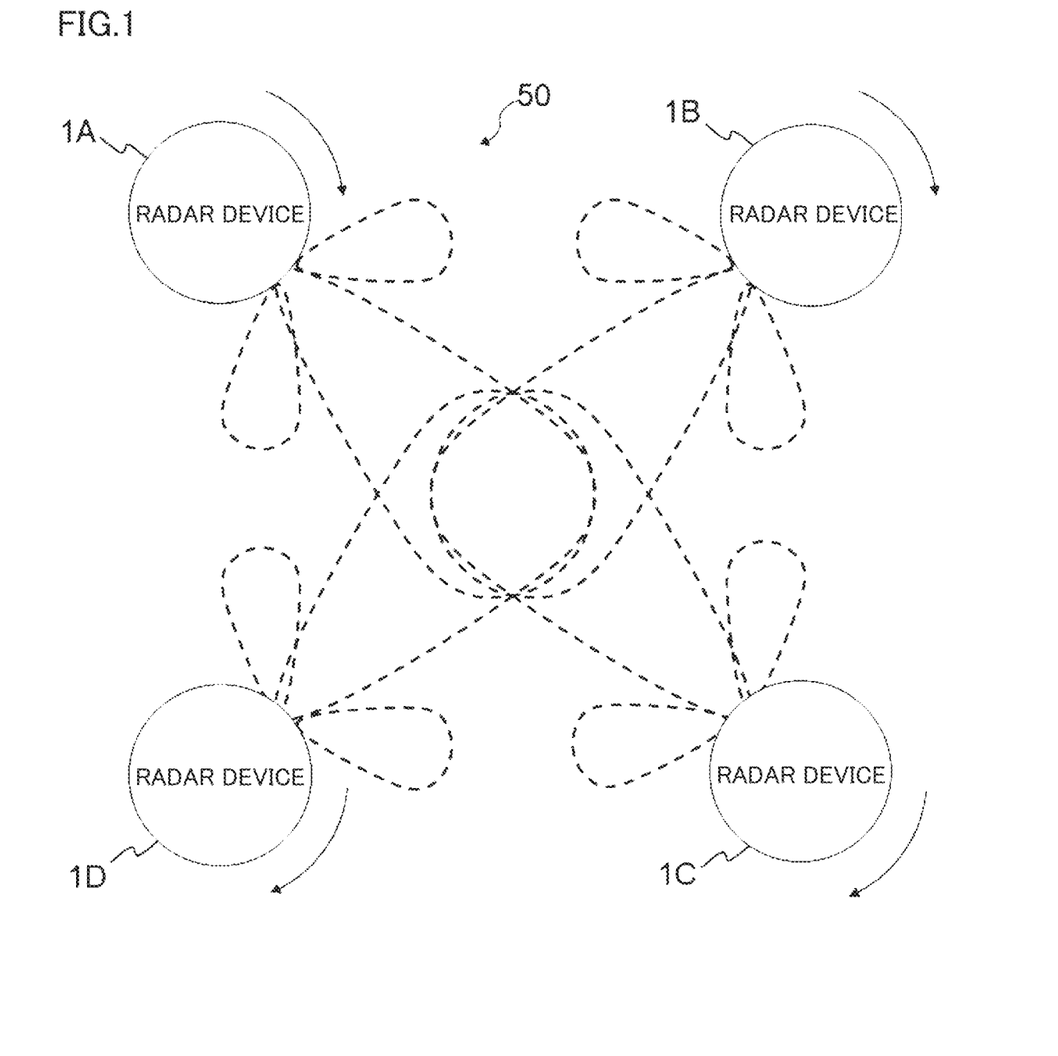
FIG. 1 is a conceptual diagram illustrating an arrangement of radar devices in a radar system and radar devices according to a first embodiment.

A radar system and radar devices according to a first embodiment are described with reference to FIGS. 1 to 6. FIG. 1 is a conceptual diagram illustrating an arrangement of four radar devices 1 as an example. FIG. 1 illustrates an example of a radar system 50 in which there exists an overlapping range in four areas each being covered by a main lobe of each of four radar devices 1, the main lobe is scanned rotationally. There may be a case in which three or more radar devices 1 are arranged at positions where parts of scanning ranges of three or more radar devices 1 overlap and interference may occur between three or more radar devices 1. Interference may occur when a main lobe of one radar device 1 faces a side lobe of another radar device 1. Even in a case where the main lobe and the side lobe face each other, parts of the scanning ranges of three or more radar devices 1 can be said to be overlapped. When the areas covered by the respective main lobes of radar devices 1 intersect with each other, interference (crosstalk) may also occur in a radio wave (echo) reflected from a target. In a case where areas covered by main lobes or side lobes of radar waves radiated by a plurality of radar devices 1 overlap, interference occurs in all of the plurality of radar devices 1.

Figure 2:
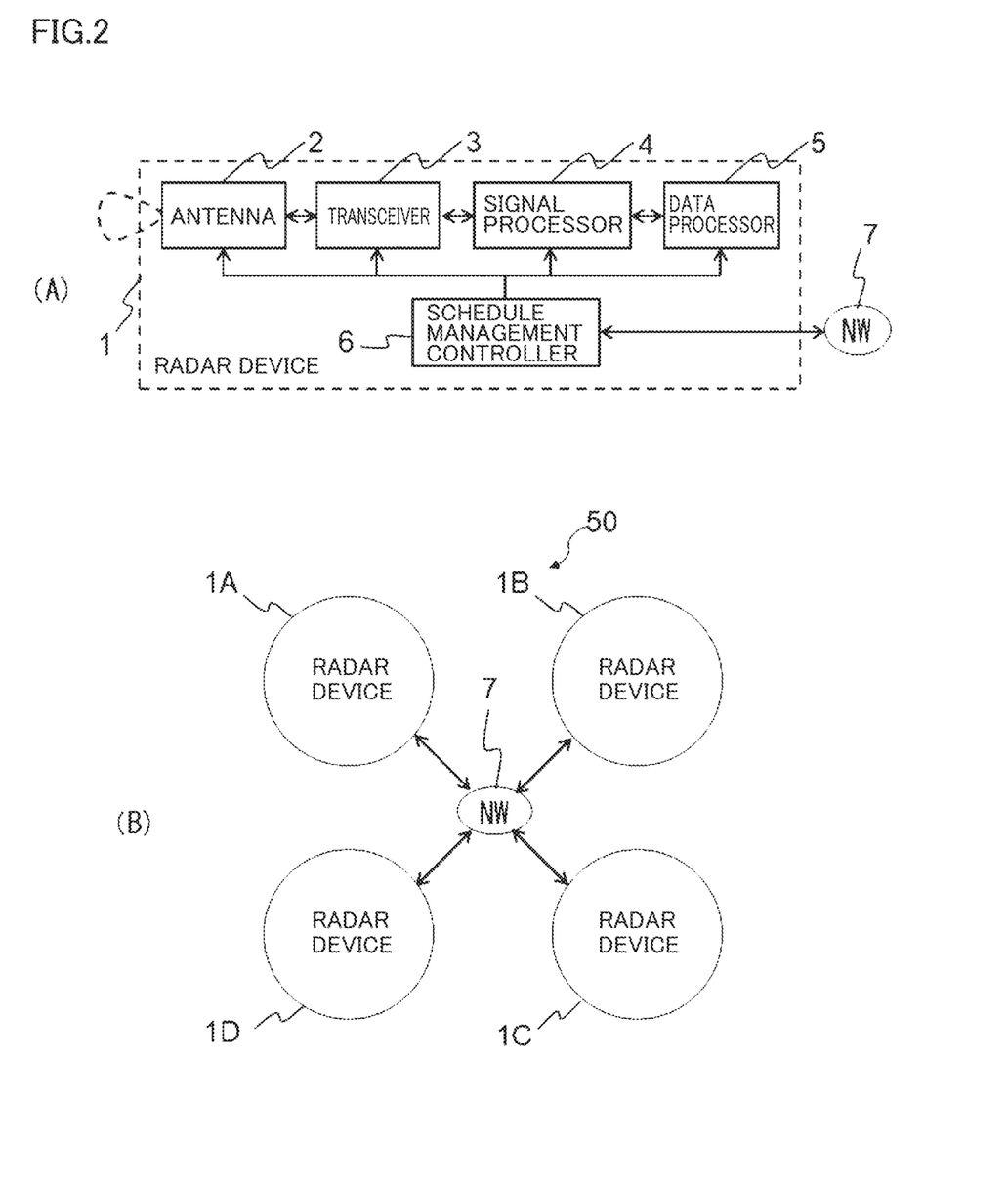
FIG. 2 is a conceptual diagram illustrating an arrangement of radar devices in the radar system and the radar devices according to the first embodiment, and is a functional block diagram of the radar device according to the first embodiment.
Figure 3:
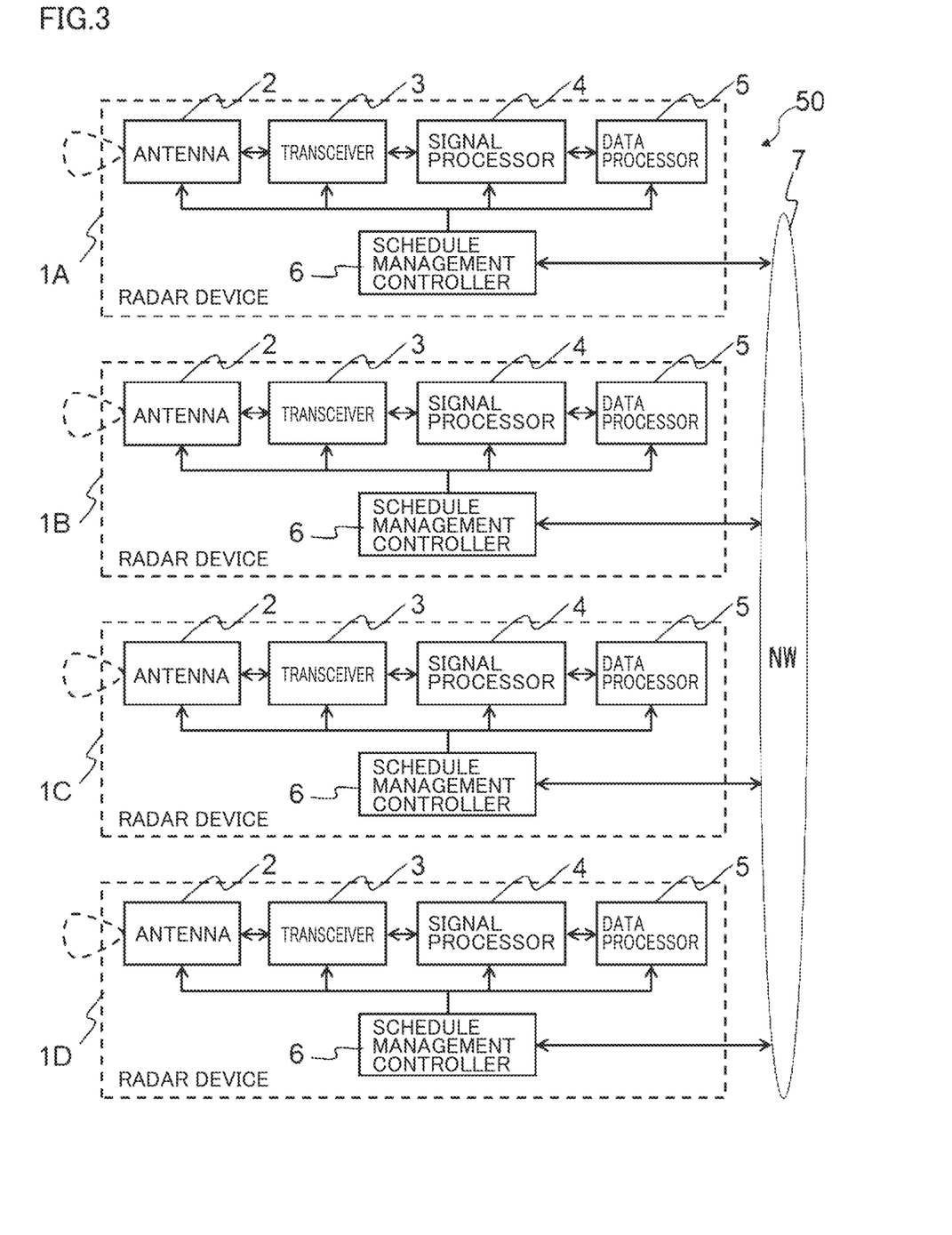
FIG. 3 is a functional block diagram of the radar system and the radar devices according to the first embodiment.
Figure 4:
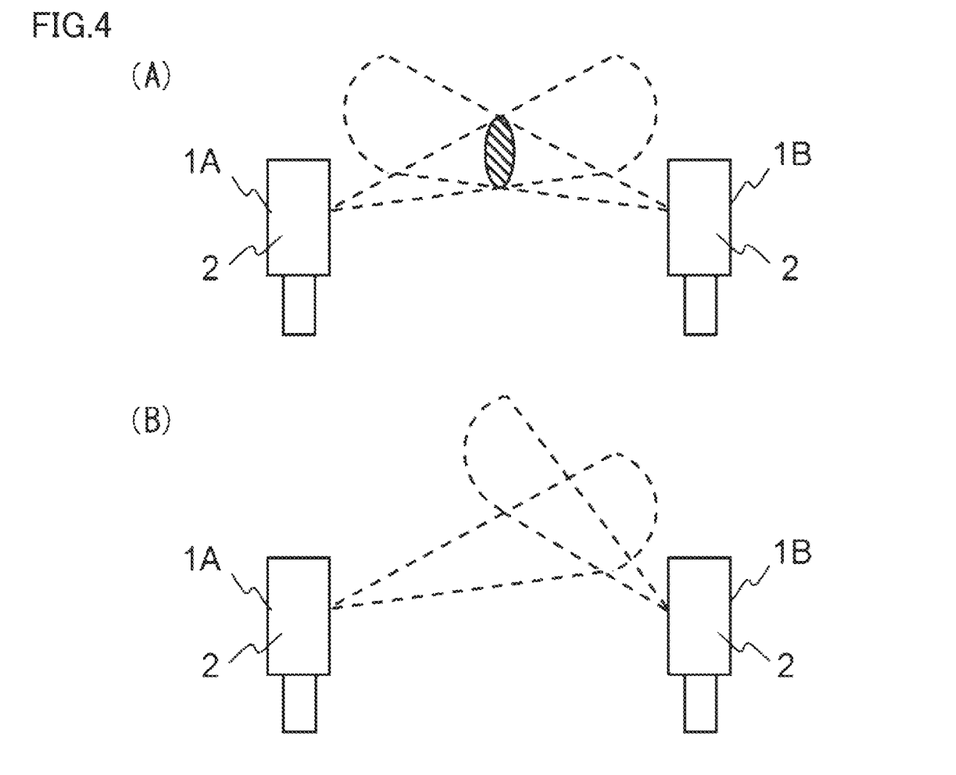
FIG. 4 is a conceptual diagram illustrating observation altitudes of the radar system and the radar devices according to the first embodiment.
Figure 5:
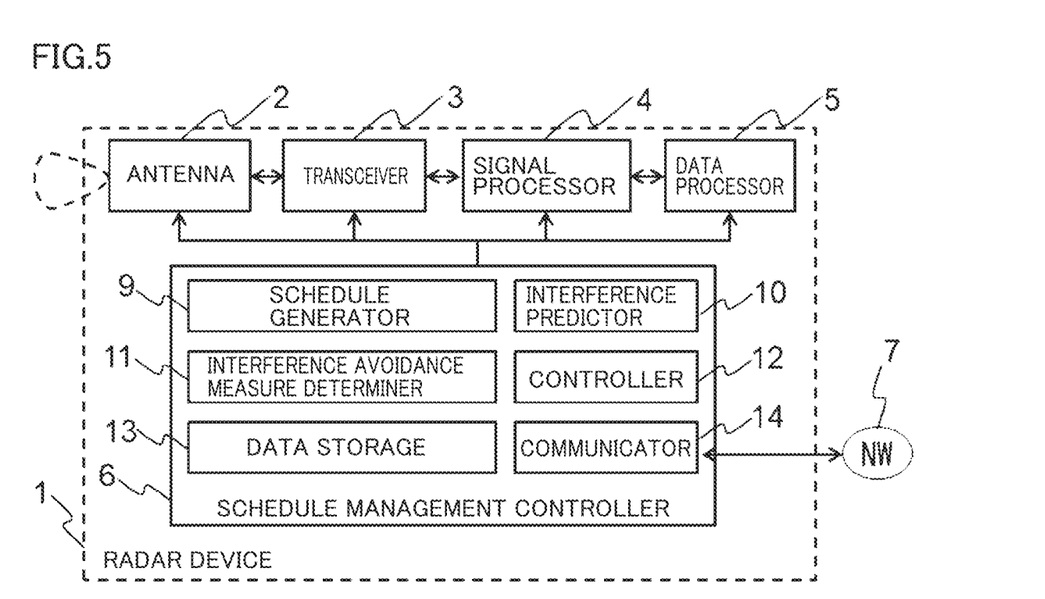
FIG. 5 is a functional block diagram illustrating a configuration of a schedule management controller included in the radar system according to the first embodiment.
Figure 6:
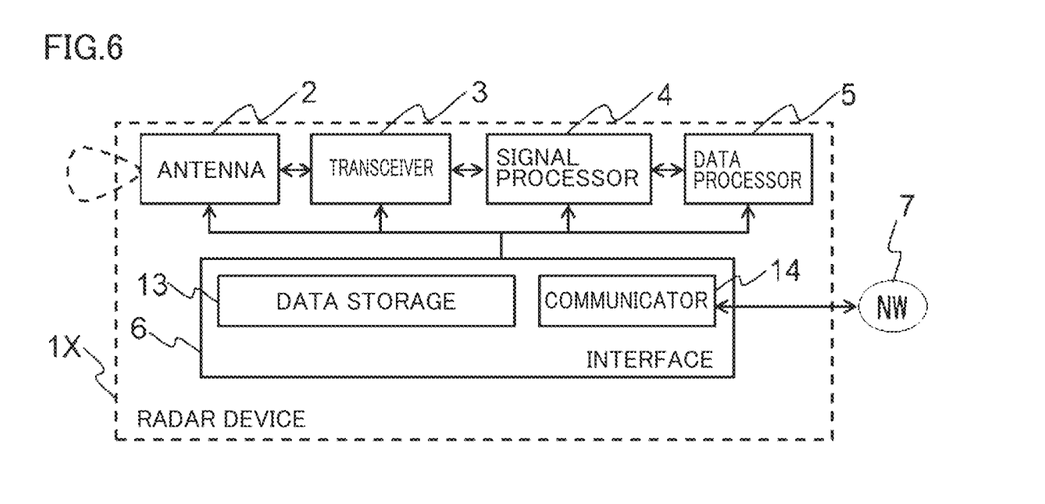
FIG. 6 is a functional block diagram of a radar device, the diagram illustrating a configuration of an interface included in a modification of the radar device according to the first embodiment.

FIG. 2(A) is a functional block diagram of the radar device according to the first embodiment. FIG. 2(B) is a conceptual diagram illustrating an arrangement of the radar devices in the radar system and the radar devices according to the first embodiment. FIG. 3 is a functional block diagram of radar system 50 in which each radar device 1 illustrated in the functional block diagram in FIG. 2(A) is installed in the arrangement illustrated in FIG. 2(B). FIG. 4(A) is a conceptual diagram illustrating observation altitudes of radar waves in a state where reflection waves of the radar waves interfere with each other. In FIG. 4(A), a region in which the observation altitudes are same is indicated by hatched lines. FIG. 4(B) is a conceptual diagram illustrating respective observation altitudes of radar waves in a state where simultaneous observation at the same altitude is not performed. The observation altitudes of two radar devices 1 are different, and thus the portion indicated by the hatched lines (the region in which the observation altitudes are same) does not exist in FIG. 4(B). FIG. 5 is a functional block diagram illustrating a configuration of a schedule management controller. FIG. 6 is a functional block diagram illustrating a configuration of an interface included in a radar device 1X, which is a modification of radar device 1. A schedule management controller 6 manages a scanning schedule of each radar device 1, and controls each radar device 1 based on the scanning schedule and an interference avoidance measure. An interface 8 allows radar device 1 to be connected to a network 7. Schedule management controller 6 also has a function of an interface.

In FIGS. 1 to 4, radar device 1 includes an antenna 2, a transceiver 3, a signal processor 4, a data processor 5, and schedule management controller 6. Three or more radar devices 1 are installed, and each radar device 1 includes antenna 2, transceiver 3, signal processor 4, data processor 5, and schedule management controller 6. The plurality of radar devices 1 forms radar system 50. Three or more radar devices 1 are arranged at positions where at least parts of scanning ranges of three or more radar devices 1 overlap and interference may occur between three or more radar devices 1, according to changes in the orientation directions. In the drawings, four radar devices 1, which are a radar device 1A, a radar device 1B, a radar device 1C, and a radar device 1D, are illustrated.

The orientation direction of radar device 1 is a direction in which a main lobe of a radar wave is radiated from antenna 2. An antenna radiates a radio wave (radar wave) referred to as a side lobe also in a direction different from the direction of the main lobe, with lower power than that of the main lobe. An angular difference of the direction in which the side lobe is radiated with respect to the direction in which the main lobe is radiated (referred to as a side-lobe angular difference) is a value determined for each antenna. In a case where each radar device 1 has the same antenna 2, each radar device 1 has the same value of the side-lobe angular difference.

In radar device 1, a direction in which the side lobe of the radar wave is radiated from antenna 2 is referred to as a secondary radiation direction. When the orientation direction of radar device 1 rotates, the secondary radiation direction also rotates while the secondary radiation direction has the side-lobe angular difference with respect to the orientation direction. The scanning range is a range in which the main lobe of radar device 1 is scanned according to the change in the orientation direction of radar device 1. Here, a range in which the side lobe of radar device 1 is scanned according to the change in the orientation direction of radar device 1, is referred to as a secondary radiation range. In a case where at least parts of the scanning ranges or the secondary radiation ranges overlap between the plurality of radar devices 1, interference occurs between the plurality of radar devices 1.

Respective schedule management controllers 6 included in radar devices 1 are connected via network 7 (denoted as NW 7 in the drawings). Alternatively, radar system 50 may include a single schedule management controller 6, which may be shared by respective radar devices 1. Each radar device 1 that does not include schedule management controller 6 includes interface 8. FIG. 6 illustrates a configuration of radar device 1X that does not include schedule management controller 6 and that includes interface 8. Interface 8 includes only a data storage 13 and a communicator 14. At least one schedule management controller 6 may be included in the radar system as a device independent from radar device 1.

In FIGS. 1 to 4, antenna 2 transmits a radar wave while changing the orientation direction, that is, the scanning range, and receives a reflection wave that is the radar wave being reflected. A scanning method may be mechanical scanning in which antenna 2 is moved or electronic scanning in which antenna 2 is not moved and the orientation direction of the radar wave is changed. Antenna 2 performs scanning in an azimuth direction (observation direction) by rotating 360°, and can also perform scanning in an elevation direction (observation altitude). The observation altitude can be changed by changing the elevation direction of antenna 2.

In FIGS. 1 to 4, transceiver 3 is connected to antenna 2, and performs a processing of transmitting the radar wave from antenna 2 and a processing of receiving a reception signal generated from the reflection wave when antenna 2 receives the reflection wave. Transceiver 3 determines a frequency of the radar wave to be transmitted, and also determines a frequency range of the reception signal to be processed by signal processor 4. Signal processor 4 is connected to transceiver 3, and performs a signal processing on the reception signal outputted from transceiver 3. Data processor 5 processes the reception signal processed by signal processor 4 as observation data. Schedule management controller 6 connects one radar device 1 and other radar devices 1 that are radar devices 1 other than the one radar device 1 by network 7. Radar device 1 may include interface 8 having a function of connecting to the network, instead of schedule management controller 6. Schedule management controller 6 performs interference avoidance between three or more radar devices 1 arranged at positions where parts of the scanning ranges or the secondary radiation ranges of three or more radar devices 1 overlap and interference may occur between three or more radar devices 1, according to changes in the orientation directions.

The positions at which interference may occur between three or more radar devices 1 are described. Radar device 1 transmits the radar wave while the orientation direction that is the direction in which the radar wave is transmitted is changed, and receives the reflection wave that is the radar wave being reflected. The scanning range of radar device 1 is a range in which the radar wave (specifically, the main lobe), is transmitted by radar device 1 while the orientation direction is changed, and is reflected. The secondary radiation range of radar device 1 is a range in which the side lobe radiated by radar device 1 is reflected. A portion (range) in which at least part of the scanning range of radar device 1 overlaps with the scanning range or the secondary radiation range of another radar device 1 is referred to as an overlapping scanning/radiation range. In a case where three or more radar devices 1 are arranged at positions where the scanning range of each of the three or more radar devices 1 overlaps with the scanning range or the secondary radiation range of each of other radar devices 1 in the same overlapping scanning/radiation range, interference may occur between three or more radar devices 1.

The overlapping in the same overlapping scanning/radiation range means that, for example, an overlapping scanning/radiation range AB in which the scanning range of radar device 1A and the scanning range or the overlapping scanning range of radar 1B overlap with each other and an overlapping scanning/radiation range AC in which the scanning range of radar device 1A and the scanning range or the overlapping scanning range of radar 1C overlap with each other have a common portion (range). The portion common between overlapping scanning/radiation range AB and overlapping scanning/radiation range AC is referred to as an overlapping scanning/radiation range ABC. In a case where overlapping scanning/radiation range ABC exists, the scanning ranges of radar devices 1A, 1B, 1C overlap with each other in the same overlapping scanning/radiation range.

Referring to FIG. 5, the configuration and operation of schedule management controller 6 are described. Schedule management controller 6 includes a schedule generator 9, an interference predictor 10, an interference avoidance measure determiner 11, a controller 12, data storage 13, and communicator 14.

Schedule generator 9 generates a scanning schedule of each radar device 1. The scanning schedule is a schedule in which temporal transition of the scanning range of radar device 1 is determined in advance. The scanning schedule also includes pulse operation information such as a pulse repetition frequency and a pulse width. Interference predictor 10 predicts whether interference occurs based on the scanning schedule, and generates interference information for each interference predicted to be occurred. Interference predictor 10 predicts one or more interference time periods. Each interference time period is a time period during which the overlapping scanning/radiation range, which is a portion where at least part of the scanning range of radar device 1 overlaps with the scanning range or the secondary radiation range of each of other radar devices 1, is formed by each radar device 1 transmitting the radar wave according to the scanning schedule. Interference predictor 10 generates the interference information for each predicted interference time period. The interference information includes the interference time period, the overlapping scanning/radiation range, and an interfering/interfered radar device set. The information of the interfering/interfered radar device set is stored such that an interfering radar device and an interfered radar device can be recognized. The interfering radar device is radar device 1 that transmits a radar wave that causes to generate an interference wave. The interfered radar device is radar device 1 that receives the interference wave. The overlapping scanning/radiation range is data representing an area that is an overlapping scanning/radiation range generated in the interference time period. The interfering/interfered radar device set is a set of radar devices 1 each having a scanning schedule in which the radar wave (main lobe or side lobe) is transmitted to the overlapping scanning/radiation range in the interference time period.

Interference avoidance measure determiner 11 determines an interference avoidance measure for each piece of interference information, when the interference information is generated. Interference avoidance measure determiner 11 determines a first interference avoidance measure that is a measure by which respective use frequencies of radar devices 1, each of which is a frequency of the radar wave to be transmitted, are made to be different each other, while keeping a restriction on the number of frequency channels, for radar devices 1 included in the interfering/interfered radar device set, in a case where the number of radar devices 1 included in the interfering/interfered radar device set is three or more. The restriction on the number of frequency channels is, for example, a restriction in which the number of frequency channels that can be used simultaneously in radar system 50 is made to be less than or equal to the upper limit. A set including radar device 1 that is included in the interfering/interfered radar device set and that is unable to avoid interference by the first interference avoidance measure is referred to as a post-frequency-change interfering/interfered radar device set. Interference avoidance measure determiner 11 determines a second interference avoidance measure for radar device 1 included in the post-frequency-change interfering/interfered radar device set.

Controller 12 controls each of radar devices 1 based on the scanning schedule, the first interference avoidance measure, and the second interference avoidance measure. Data storage 13 stores the scanning schedule, the interference information, the first interference avoidance measure, the second interference avoidance measure, and the like. Communicator 14 communicates with other radar devices 1.

Schedule management controller 6 predicts the interference time period during which at least parts of the scanning ranges or the secondary radiation ranges of three or more radar devices 1 overlap with each other, and determines the interfering/interfered radar device set for each interference time period. Schedule management controller 6 determines the first interference avoidance measure by which respective different use frequencies are used for radar devices 1 included in the interfering/interfered radar device set, during the predicted interference time period, while keeping the restriction on the number of frequency channels. Then, schedule management controller 6 provides an instruction on the use frequency to transceiver 3 included in radar device 1 in which the use frequency is determined. The set including radar device 1 that is unable to avoid interference by the first interference avoidance measure is referred to as the post-frequency-change interfering/interfered radar device set. Schedule management controller 6 determines the second interference avoidance measure to be performed by radar device 1 included in the post-frequency-change interfering/interfered radar device set.

In the first interference avoidance measure, schedule management controller 6 may determine respective use frequencies of radar devices 1 such that the use frequency of at least one of radar devices 1 is fixed, and may instruct respective transceivers 3 of the other radar devices 1 for which the respective use frequencies have been determined to use respective different use frequencies. A plurality of radar devices 1 include respective schedule management controllers 6. Schedule management controllers 6 are synchronized and share information about the interference time period, and the like. Among schedule management controllers 6, only one schedule management controller 6 performs operation such as determination of the interference avoidance measure. When an abnormality occurs in schedule management controller 6 that performs the operation and schedule management controller 6 stops performing the operation, another schedule management controller 6 that does not perform the operation can take over the data to perform the operation.

Next, four examples of the second interference avoidance measure are described. Schedule management controller 6 determines, as the second interference avoidance measure, any one of scanning range change, interference wave removal, transmission blank, and use frequency change. The scanning range change is a measure by which schedule management controller 6 instructs antenna 2 included in radar device 1 included in the post-frequency-change interfering/interfered radar set to change the scanning schedule in the interference time period, to scan a range different from the overlapping scanning/radiation range in the interference time period. The scanning range change can be performed for the observation altitude as illustrated in FIG. 4 as well as for a range of an azimuth angle to be scanned. The second interference avoidance measure is performed by radar device 1 included in the post-frequency-change interfering/interfered radar set. Interference does not occur even when radar devices direct in the same azimuth direction, by avoiding observing the region having the same altitude as indicated by the hatched lines in FIG. 4(A) (for example, in the state illustrated in FIG. 4(B), that is, in the state where elevation directions are different).

In the interference wave removal, an interference wave derived from a radar wave of another radar device 1 having the same use frequency as that of radar device 1 is removed from the observation data. The interference wave derived from the radar wave of another radar device 1 is observation data derived from the radar wave of another radar device 1 among reception signal components in a frequency band including the frequency of the radar wave and determined by considering the width of the Doppler frequency shift. For a method of detecting from which radar device 1 the interference wave is derived, a known general technique is used such as a method of detecting by using detected periodicity based on the pulse operation information including the pulse repetition frequency and the pulse width. The interference wave removal is caused to be performed by radar device 1 that is included in the post-frequency-change interfering/interfered radar set and that uses the same frequency as that of radar device 1 whose use frequency is determined in the first interference avoidance measure. Schedule management controller 6 instructs signal processor 4 included in such radar device 1 to remove the interference wave derived from the radar wave of radar device 1 having the same use frequency from the observation data.

An example of the interference wave removal performed by signal processor 4 with the instruction from schedule management controller 6 is a technique of receiving an intended signal that is obtained by reflection of a transmission signal (radar wave) from an observation target and an interference wave derived from a radar wave transmitted from another radar device 1, detecting observation data being interfering, and removing the interference wave itself. That is, the interference wave removal may be any operation that removes a radar wave of an opponent from observation data. Removing the interference wave (the radar wave of the opponent) from the observation data means removing the interference wave (the radar wave of the opponent) in signal processor 4 in advance before data processor 5 processes a signal of the radar wave processed in signal processor 4 as observation data. That is, this removal is performed by signal processor 4 in advance to avoid obtaining the observation data mixed with the interference wave (the radar wave of the opponent).

The transmission blank is a measure to cause radar device 1 not to transmit the radar wave, or not to transmit and not to receive the radar wave to and/or from the overlapping scanning/radiation range in the interference time period. Schedule management controller 6 instructs data processor 5 included in radar device 1 included in the post-frequency-change interfering/interfered radar set to perform transmission blank (suspension of transmission of the radar wave or suspension of transmission and reception of the radar wave).

By the transmission blank performed by data processor 5, radar device is caused not to transmit the radar wave or not to transmit and not to receive the radar wave during the interference time period in a region where interference may occur (the overlapping scanning/radiation range) within the scanning range. It may be optional for the radar device to transmit to a scanning range different from the overlapping scanning/radiation range during the interference time period.

The use frequency change is a measure by which the use frequency of radar device 1 is set to be different from the use frequency determined by the first interference avoidance measure. Schedule management controller 6 instructs transceiver 3 included in radar device 1 included in the post-frequency-change interfering/interfered radar set to use a frequency that is not the use frequency determined in the first interference avoidance measure.

Schedule management controller 6 determines the second interference avoidance measure that causes any one of the scanning range change, the interference wave removal, the transmission blank, and the use frequency change to be performed, for radar device 1 included in the post-frequency-change interfering/interfered radar set. In a case where the number of radar devices 1 included in the post-frequency-change interfering/interfered radar set is two or more, schedule management controller 6 determines to make respective different second interference avoidance measures to be performed, for two or more radar devices 1.

The schedule management controller may determine, as the second interference avoidance measure, other avoidance measure different from each of the scanning range change, the interference wave removal, the transmission blank, and the use frequency change, and to cause the other avoidance measure to be performed. One or some of the scanning range change, the interference wave removal, the transmission blank, and the use frequency change may not be determined by the schedule management controller, and may not be performed, as the second interference avoidance measure. The schedule management controller may be any schedule management controller that selects any one of the measures included in a second interference avoidance measure set including at least one of the scanning range change, the interference wave removal, the transmission blank, and the use frequency change, determines the selected one as the second avoidance measure, and causes the selected one to be performed.

In a case where schedule management controller 6 determines to instruct signal processor 3 included in radar device 1 included in the post-frequency-change interfering/interfered radar set to perform the interference wave removal as the second interference avoidance measure in the interference time period, schedule management controller 6 may determine a second interference avoidance measure to cause the following processing also to be performed. That is, when schedule management controller 6 determines to instruct signal processor 3 included in radar device 1 included in the post-frequency-change interfering/interfered radar set to perform the interference wave removal as the second interference avoidance measure, schedule management controller 6 may determine a second interference avoidance measure that includes a processing of notifying the interfered radar device, which is radar device 1 caused to perform the interference wave removal, of the pulse operation information of the interfering radar device, which is radar device 1 generating the interference wave to be removed, and that causes the interfered radar device to perform the interference wave removal. The interfered radar device notified of the pulse operation information of the interfering radar device identifies and removes the interference wave derived from the radar wave transmitted from the interfering radar device by using the pulse operation information.

Schedule management controller 6 may cause the scanning range change to be performed as the second interference avoidance measure in the interference time period by instructing the antenna included in radar device 1 included in the post-frequency-change interfering/interfered radar set, and may predict an interference time period newly generated by performing the scanning range change. When interference occurs between three or more radar devices 1 in the newly generated interference time period, schedule management controller 6 may make radar devices 1 to use respective use frequencies different from each other by instructing transceiver 3 included in radar device 1 that can change the use frequency while keeping the restriction on the number of frequency channels, and is included in three or more radar devices 1.

An interference avoidance method according to the first embodiment is described below with reference to FIGS. 7 and 8. The interference avoidance method according to the first embodiment is an interference avoidance method performed to avoid interference between three or more radar devices 1 arranged at positions where parts of the scanning ranges of three or more radar devices 1 overlap and interference may occur between three or more radar devices 1, according to changes in the orientation directions. That is, the interference avoidance method according to the first embodiment is an interference avoidance method performed by operation of radar system 50 and radar device 1 according to the first embodiment. Radar system 50 and radar device 1 include schedule management controller 6.

The interference avoidance method is performed by a radar device and a radar system including antenna 2, transceiver 3, signal processor 4, data processor 5, and schedule management controller 6. Schedule management controller 6 includes the schedule generator that generates at least the scanning schedule in which temporal transition of the scanning range of radar device 1 is determined in advance. The radar system includes three or more radar devices 1. Three or more radar devices 1 are arranged to have the overlapping scanning/radiation range, which is a range at which the scanning range of one radar device 1 overlaps with the scanning range or the secondary radiation range of each of other radar devices 1, being overlapped in the same overlapping scanning/radiation range.

Figure 7:
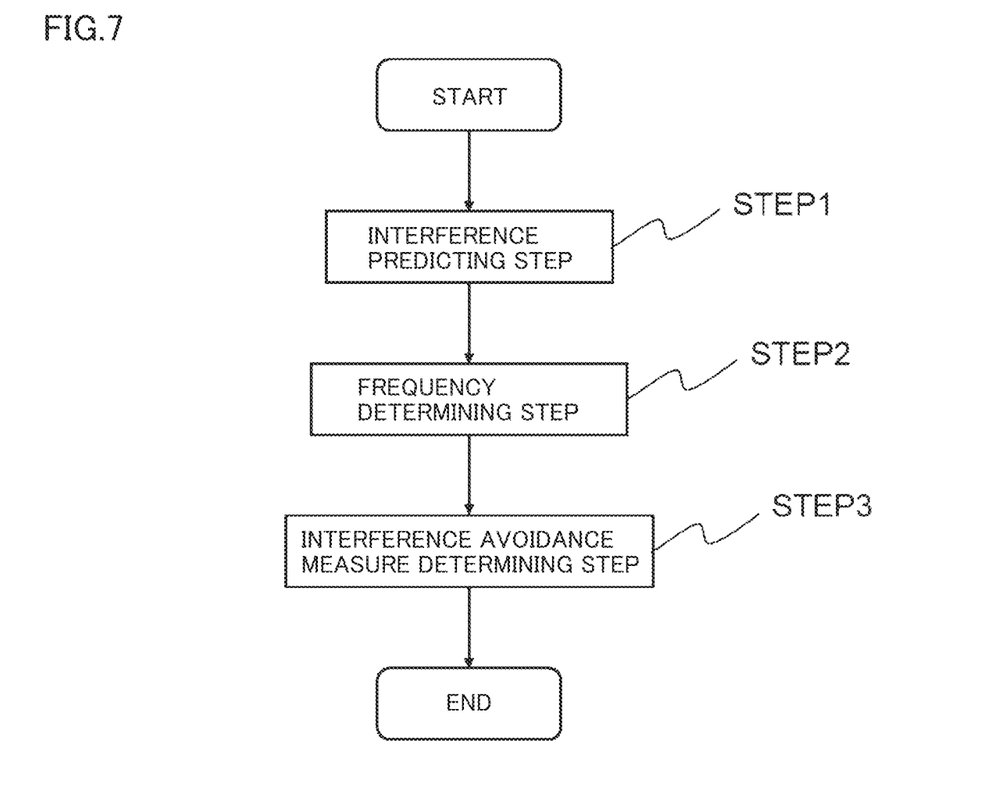
FIG. 7 is a flowchart illustrating operation of the radar system and the radar devices according to the first embodiment (an interference avoidance method according to the first embodiment).

As illustrated in FIG. 7, the interference avoidance method according to the first embodiment includes fundamental processing steps including an interference predicting step (step 1), a frequency determining step (step 2), and an interference avoidance measure determining step (step 3).

In the interference predicting step, the interference time period is predicted during which at least parts of the scanning ranges of three or more radar devices 1 overlap with each other, based on the scanning schedule. That is, in the interference predicting step, the interference time period is predicted that is the time period during which the overlapping scanning/radiation range is generated, which is the portion where at least part of the scanning range of radar device 1 overlaps with the scanning ranges or the secondary radiation ranges of other radar devices 1. In the interference predicting step, for each predicted interference time period, the interference information is generated that includes the interfering/interfered radar device set, which is the set of radar devices 1 each having the scanning schedule in which the radar wave (main lobe or side lobe) is transmitted to the overlapping scanning/radiation range in the interference time period, the overlapping scanning/radiation range, and the interference time period.

In the frequency determining step, radar devices 1 that can change the use frequencies while keeping the restriction on the number of frequency channels, among three or more radar devices 1 are made to use respective use frequencies being different from each other, during the interference time period predicted in the interference predicting step. That is, in the frequency determining step, in a case where the interference information is generated, the use frequencies, each of which is the frequency of the radar wave to be transmitted, are determined, for the radar devices included in the interfering/interfered radar device set, such that the use frequencies are made to be different, while keeping the restriction on the number of frequency channels, in a case where the number of radar devices 1 included in the interfering/interfered radar device set is three or more.

In the interference avoidance measure determining step, the second interference avoidance measure to be performed by radar device 1 included in the post-frequency-change interfering/interfered radar set is determined.

Specifically, in the interference avoidance measure determining step, radar device 1 is caused to perform any one of the scanning range change, the interference wave removal, the transmission blank, and the use frequency change, in the interference time period. The scanning range change, the interference wave removal, the transmission blank, and the use frequency change have been described above. In the interference avoidance measure determining step, in a case where the number of radar devices 1 included in the post-frequency-change interfering/interfered radar set is two or more, respective different second interference avoidance measures may be determined for the two or more radar devices 1.

In the interference avoidance measure determining step, when the operation of the interference wave removal is determined to be performed as the second interference avoidance measure, the second interference avoidance measure may be determined that includes a processing of notifying the interfered radar device, which is radar device 1 caused to perform the interference wave removal, of the pulse operation information of the interfering radar device, which is radar device 1 generating the interference wave to be removed, and that causes the interfered radar device to perform the interference wave removal. The interfered radar device notified of the pulse operation information of the interfering radar device identifies and removes the interference wave derived from the radar wave transmitted from the interfering radar device by using the pulse operation information. In the frequency determining step, the use frequency, to be used, of at least one of three or more radar devices 1 may be fixed, and it may be determined that radar devices 1 included in three or more radar devices 1 are made to use respective different use frequencies while keeping the restriction on the number of frequency channels.

Figure 8:
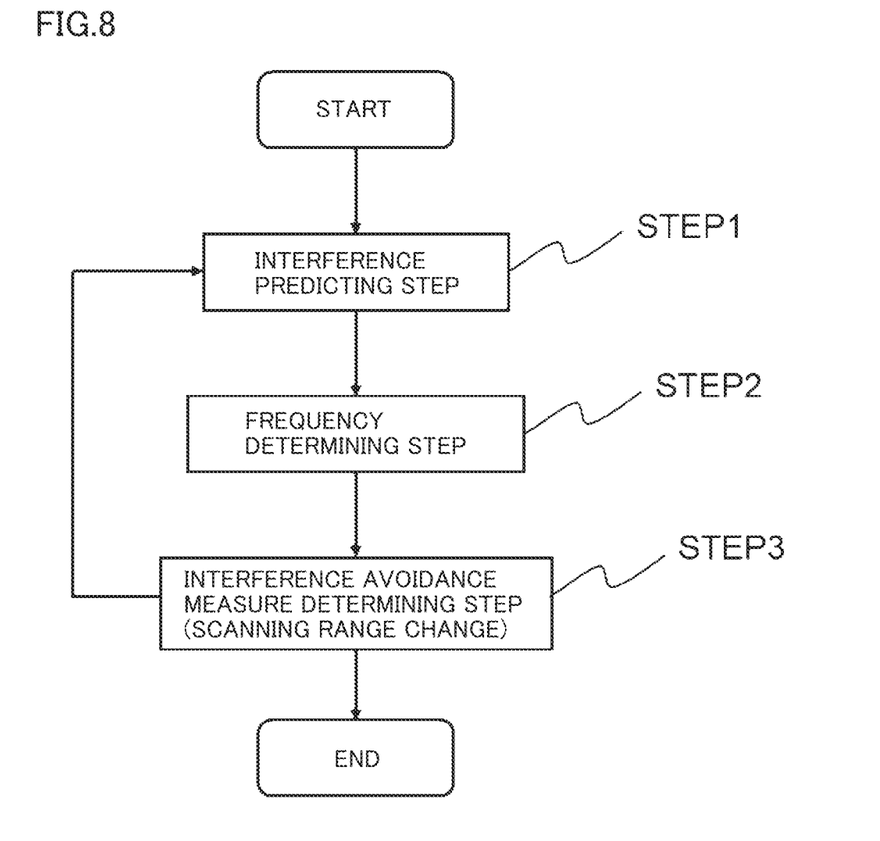
FIG. 8 is a flowchart illustrating other operation of the radar system and the radar devices according to the first embodiment (the interference avoidance method according to the first embodiment).

In the interference avoidance method according to the first embodiment, processing steps illustrated in FIG. 8 may be performed. In the interference avoidance measure determining step, the operation of the scanning range change is determined to be performed as the second interference avoidance measure, in the interference time period. The interference predicting step is performed as the following step. In the interference predicting step, an interference time period newly generated by performing the scanning range change is predicted. Then, in the frequency determining step, it is determined that radar devices 1 included in three or more radar devices 1 are made to use the respective different use frequencies while keeping the restriction on the number of frequency channels, in the newly generated interference time period.

In the interference avoidance measure determining step, determination is made to cause one operation, which is selected from the second interference avoidance measure set including at least one of the scanning range change, the interference wave removal, the transmission blank, and the use frequency change described above, to be performed as the second interference avoidance measure.

Thus, the radar system, the radar device, and the interference avoidance method according to the first embodiment can utilize the frequency effectively by first determining the use frequencies while keeping the restriction on the number of frequency channels, among radar devices 1, and by then determining the interference countermeasure for radar device 1 that cannot avoid the interference by making the use frequency to be changed. That is, in a case where interference occurs between three or more radar devices 1, in addition to a radar device that avoids interference by making a use frequency of the radar device to be different, it is possible to have another radar device that performs an interference countermeasure.

Modifications of the embodiment, omission of some components, and free combinations of modifications and omissions are possible.

REFERENCE SIGNS LIST

1, 1X: radar device, 2: antenna, 3: transceiver, 4: signal processor, 5: data processor, 6: schedule management controller (interface), 7: network (NW), 8: interface, 9: schedule generator, 10: interference predictor, 11: interference avoidance measure determiner, 12: controller, 13: data storage, 14: communicator, 50: radar system

The invention claimed is:

1. A radar system comprising:
   three or more radar devices, each of the three or more radar devices including:
   an antenna to transmit a radar wave while changing an orientation direction being a direction in which the radar wave is transmitted, and to receive a reflection wave being the radar wave being reflected;
   a transceiver, connected to the antenna, to perform a processing of transmitting the radar wave and a processing of receiving a reception signal generated by the antenna from the reflection wave received by the antenna;
   a signal processor, connected to the transceiver, to perform a signal processing on the reception signal generated from the reflection wave; and
   a data processor to process the reception signal processed by the signal processor as observation data, wherein
   the three or more radar devices are arranged to have an overlapping scanning/radiation range being a range at which at least part of a scanning range of one of the three or more radar devices overlaps with the scanning range or a secondary radiation range of each of other radar devices, the same overlapping scanning/radiation range being overlapped by each of the three or more radar devices, the scanning range and the secondary radiation range of the radar device being ranges in each of which the radar wave, is transmitted and is received while the orientation direction is changed; and
   a schedule management controller including:
   a schedule generator to generate a scanning schedule in which temporal transition of the scanning range of each of the three or more radar devices is determined in advance;
   an interference predictor to predict one or more interference time periods each being a time period during which the overlapping scanning/radiation range is generated by each of the three or more radar devices transmitting the radar wave according to the scanning schedule, and to generate, for each of the one or more interference time periods that has been predicted, interference information including an interfering/interfered radar device set, the overlapping scanning/radiation range and the interference time period, the interfering/interfered radar device set being a set of the radar devices each having the scanning schedule in which the radar wave is transmitted to the overlapping scanning/radiation range in the interference time period;
   an interference avoidance measure determiner to determine, when the interference information in which the interfering/interfered radar device set includes three or more of the radar devices is generated, a first interference avoidance measure and a second interference avoidance measure, the first interference avoidance measure being a measure to make use frequency being a frequency of the radar wave transmitted by each of the radar devices to be different each other while keeping a restriction on a number of frequency channels, the second interference avoidance measure being a measure to be performed by each of the radar devices included in a post-frequency-change interfering/interfered radar device set, the post-frequency-change interfering/interfered radar device set being a set including the radar devices each being unable to avoid interference by the first interference avoidance measure and included in the interfering/interfered radar device set; and
   a controller to control each of the three or more radar devices, based on the scanning schedule, the first interference avoidance measure, and the second interference avoidance measure.

2. The radar system according to claim 1, wherein the second interference avoidance measure is one selected from a second interference avoidance measure set including at least one of:
   scanning range change being a measure to make the radar wave to be transmitted from the antenna to the scanning range that is not the overlapping scanning/radiation range, in the interference time period;
   interference wave removal being a measure to cause the signal processor to remove an interference wave derived from the radar device included in the post-frequency-change interfering/interfered radar device set;

transmission blank being a measure to cause the antenna not to transmit the radar wave or not to transmit and not to receive the radar wave in the interference time period; and use frequency change being a measure to cause the radar wave having a frequency different from the use frequencies used in the first interference avoidance measure to be transmitted.

3. The radar system according to claim 2, wherein when the interference avoidance measure determiner determines to cause the interference wave removal to be performed as the second interference avoidance measure, the interference avoidance measure determiner determines the second interference avoidance measure that causes an interfered radar device to perform the interference wave removal, and that includes a processing of notifying the interfered radar device of pulse operation information of an interfering radar device, the interfered radar device being one of the radar devices included in the post-frequency-change interfering/interfered radar device set and caused to perform the interference wave removal, the interfering radar device being the radar device generating an interference wave to be removed.

4. The radar system according to claim 1, wherein when a number of the radar devices included in the post-frequency-change interfering/interfered radar device set is two or more, the interference avoidance measure determiner determines a plurality of the second interference avoidance measures that are different from each other for the radar devices included in the post-frequency-change interfering/interfered radar device set.

5. The radar system according to claim 1, wherein when the interference avoidance measure determiner determines to cause the radar device included in the post-frequency-change interfering/interfered radar device set to perform the scanning range change, as the second interference avoidance measure, in the interference time period, the interference predictor predicts whether the interference time period is newly generated by performing the scanning range change, and when the interference predictor predicts that the interference time period is newly generated, the interference predictor newly generates the interference information.

6. The radar system according to claim 5, wherein when the interference predictor newly generates the interference information, the interference avoidance measure determiner determines the first interference avoidance measure to make the use frequencies of the radar devices included in the interfering/interfered radar device set to be different while keeping a restriction on a number of frequency channels.

7. The radar system according to claim 1, wherein when the number of the radar devices included in the interfering/interfered radar device set is three or more, the interference avoidance measure determiner fixes the use frequency of at least one of the radar devices included in the interfering/interfered radar device set, and determines the first interference avoidance measure.

8. The radar system according to claim 1, wherein
each of the three or more radar devices includes the schedule management controller, and
the schedule management controller included in any one of the three or more radar devices operates.

9. A radar device comprising:
an antenna to transmit a radar wave while an orientation direction being a direction in which the radar wave is transmitted is changed, and to receive a reflection wave being the radar wave being reflected;

a transceiver, connected to the antenna, to perform a processing of transmitting the radar wave and a processing of receiving a reception signal generated by the antenna from the reflection wave received by the antenna;

a signal processor, connected to the transceiver, to perform a signal processing on the reception signal generated from the reflection wave;

a data processor to process the reception signal processed by the signal processor as observation data; and a schedule management controller, wherein the radar device is arranged to have an overlapping scanning/radiation range being a range at which at least part of a scanning range of the radar device overlaps with the scanning range or a secondary radiation range of each of other radar devices, the same overlapping scanning/radiation range being overlapped together with other two or more radar devices, the scanning range and the secondary radiation range of the radar device being ranges in each of which the radar wave, is transmitted and is received while the orientation direction is changed, and the schedule management controller includes:

a schedule generator to generate a scanning schedule in which temporal transition of the scanning range of a radar device is determined in advance;

an interference predictor to predict one or more interference time periods each being a time period during which the overlapping scanning/radiation range is generated by each radar device transmitting the radar wave according to the scanning schedule; and to generate, for each of the one or more interference time periods that has been predicted, interference information including an interfering/interfered radar device set, the overlapping scanning/radiation range, and the interference time period, the interfering/interfered radar device set being a set of the radar devices each having the scanning schedule in which the radar wave is transmitted to the overlapping scanning/radiation range in the interference time period;

an interference avoidance measure determiner to determine, when the interference information in which the interfering/interfered radar device set includes three or more of the radar devices is generated, a first interference avoidance measure and a second interference avoidance measure, the first interference avoidance measure being a measure to make use frequency being a frequency of the radar wave transmitted by each of the radar devices to be different each other while keeping a restriction on a number of frequency channels, the second interference avoidance measure being a measure to be performed by each radar device included in a post-frequency-change interfering/interfered radar device set, the post-frequency-change interfering/interfered radar device set being a set including the radar devices each being unable to avoid interference by the first interference avoidance measure and included in the interfering/interfered radar device set; and a controller to control each radar device, based on the scanning schedule, the first interference avoidance measure, and the second interference avoidance measure.

10. The radar device according to claim 9, wherein the second interference avoidance measure is one selected from a second interference avoidance measure set including at least one of:

scanning range change being a measure to make the radar wave to be transmitted from the antenna to the scanning range that is not the overlapping scanning/radiation range, in the interference time period;

interference wave removal being a measure to cause the signal processor to remove an interference wave derived from the radar device included in the post-frequency-change interfering/interfered radar device set;

transmission blank being a measure to cause the antenna not to transmit the radar wave or not to transmit and not to receive the radar wave in the interference time period; and use frequency change being a measure to cause the radar wave having a frequency different from the use frequencies used in the first interference avoidance measure to be transmitted.

11. The radar device according to claim 10, wherein when the interference avoidance measure determiner determines to cause the interference wave removal to be performed as the second interference avoidance measure, the interference avoidance measure determiner determines the second interference avoidance measure that causes an interfered radar device to perform the interference wave removal, and that includes a processing of notifying the interfered radar device of pulse operation information of an interfering radar device, the interfered radar device being one of the radar devices included in the post-frequency-change interfering/interfered radar device set and caused to perform the interference wave removal, the interfering radar device being the radar device generating an interference wave to be removed.

12. The radar device according to claim 9, wherein when a number of the radar devices included in the post-frequency-change interfering/interfered radar device set is two or more, the interference avoidance measure determiner determines a plurality of the second interference avoidance measures that are different from each other for the radar devices included in the post-frequency-change interfering/interfered radar device set.

13. The radar device according to claim 9, wherein when the interference avoidance measure determiner determines to cause the radar device included in the post-frequency-change interfering/interfered radar device set to perform the scanning range change, as the second interference avoidance measure, in the interference time period, the interference predictor predicts whether the interference time period is newly generated by performing the scanning range change, and when the interference predictor predicts that the interference time period is newly generated, the interference predictor newly generates the interference information.

14. The radar device according to claim 13, wherein when the interference predictor newly generates the interference information, the interference avoidance measure determiner determines a first interference avoidance measure to make the use frequencies of the radar devices included in the interfering/interfered radar device set to be different, for the radar devices included in the interfering/interfered radar device set.

15. The radar device according to claim 9, wherein when the number of the radar devices included in the interfering/interfered radar device set is three or more, the interference avoidance measure determiner fixes the use frequency of at least one of the radar devices included in the interfering/interfered radar device set, and determines the first interference avoidance measure.

16. An interference avoidance method of avoiding interference between three or more radar devices, each of the three or more radar devices including:

an antenna to transmit a radar wave while changing an orientation direction being a direction in which the radar wave is transmitted, and to receive a reflection wave being the radar wave being reflected;

a transceiver, connected to the antenna, to perform a processing of transmitting the radar wave and a processing of receiving a reception signal generated by the antenna from the reflection wave received by the antenna;

a signal processor, connected to the transceiver, to perform a signal processing on the reception signal generated from the reflection wave; and a data processor to process the reception signal processed by the signal processor as observation data, the three or more radar devices being arranged to have an overlapping scanning/radiation range being a range at which at least part of a scanning range of one of the three or more radar devices overlaps with the scanning range or a secondary radiation range of each of other radar devices, the same overlapping scanning/radiation range being overlapped by each of the three or more radar devices, the scanning range and the secondary radiation range of the radar device being ranges in each of which the radar wave, is transmitted and is received while the orientation direction is changed, the method comprising:

an interference predicting step of predicting one or more interference time periods each being a time period during which the overlapping scanning/radiation range is generated by radiating the radar wave of each of the three or more radar devices according to a scanning schedule in which temporal transition of the scanning range of each of the three or more radar devices is determined in advance, and generating, for each of the one or more interference time periods that has been predicted, interference information including an interfering/interfered radar device set, the overlapping scanning/radiation range and the interference time period, the interfering/interfered radar device set being a set of the radar devices each having the scanning schedule in which the radar wave is transmitted to the overlapping scanning/radiation range in the interference time period;

a frequency determining step of determining, when the interference information in which the interfering/interfered radar device set include three or more of the radar devices is generated, a first interference avoidance measure being a measure to make use frequency being a frequency of the radar wave transmitted by each of the radar devices to be different each other while keeping a restriction on a number of frequency channels, for the radar devices included in the interfering/interfered radar device set; and an interference avoidance measure determining step of determining a second interference avoidance measure to be performed by each of the radar devices included in a post-frequency-change interfering/interfered radar device set, the post-frequency-change interfering/interfered radar device set being a set including the radar devices each being unable to avoid interference by the first interference avoidance measure and included in the interfering/interfered radar device set.

17. The interference avoidance method according to claim 16, wherein in the interference avoidance measure determining step, determination is made to cause one operation to be performed as the second interference avoidance measure, the one operation being selected from a second interference avoidance measure set including at least one of:
- scanning range change being a measure to make the radar wave to be transmitted from the antenna to the scanning range that is not the overlapping scanning/radiation range, in the interference time period;
- interference wave removal being a measure to cause the signal processor to remove an interference wave derived from the radar device included in the post-frequency-change interfering/interfered radar device set is removed;
- transmission blank being a measure to cause the antenna not to transmit the radar wave or not to transmit and not to receive the radar wave in the interference time period; and
- use frequency change being a measure to cause the radar device to transmit the radar wave having a frequency different from the use frequencies used in the first interference avoidance measure.

18. The interference avoidance method according to claim 17, wherein in the interference avoidance measure determining step, when the interference wave removal is determined to be performed as the second interference avoidance measure, the second interference avoidance measure that causes an interfered radar device to perform the interference wave removal, and that includes a processing of notifying the interfered radar device of pulse operation information of an interfering radar device is determined, the interfered radar device being one of the radar devices included in the post-frequency-change interfering/interfered radar device set and caused to perform the interference wave removal, the interfering radar device being the radar device generating an interference wave to be removed.

19. The interference avoidance method according to claim 16, wherein in the interference avoidance measure determining step, when a number of the radar devices included in the post-frequency-change interfering/interfered radar device set is two or more, a plurality of the second interference avoidance measures that are different from each other is determined for the radar devices included in the post-frequency-change interfering/interfered radar device set.

20. The interference avoidance method according to claim 16, wherein when in the interference avoidance measure determining step, the radar device included in the post-frequency-change interfering/interfered radar device set is determined to be caused to perform the scanning range change as the second interference avoidance measure in the interference time period, the interference predicting step is performed to predict whether the interference time period is newly generated by performing the scanning range change, and when a result of the prediction is that the interference time period is newly generated, the interference information is newly generated in the interference predicting step.

21. The interference avoidance method according to claim 20, wherein when in the interference predicting step, the interference information is newly generated, the first interference avoidance measure to make the use frequencies of the radar devices included in the interfering/interfered radar device set to be different while keeping a restriction on a number of frequency channels is determined in the frequency determining step.

22. The interference avoidance method according to claim 16, wherein in the frequency determining step, when the number of the radar devices included in the interfering/interfered radar device set is three or more, the use frequency of at least one of the radar devices included in the interfering/interfered radar device set is fixed, and the first interference avoidance measure is determined.

* * * * *